United States Patent
Yasuda et al.

(10) Patent No.: US 9,701,806 B2
(45) Date of Patent: Jul. 11, 2017

(54) SURFACE TREATMENT AGENT AND SURFACE TREATMENT METHOD

(71) Applicant: NIPPON PAINT CO., LTD., Osaka (JP)

(72) Inventors: Kazufumi Yasuda, Tokyo (JP); Hidekimi Hirasawa, Tokyo (JP); Kenji Tsuge, Tokyo (JP); Akihiro Mizuno, Tokyo (JP); Ryohei Shizuka, Tokyo (JP)

(73) Assignee: CHEMETALL GMBH, Frankfurt am Main (DE)

(*) Notice: Subject to any disclaimer, the term of this patent is extended or adjusted under 35 U.S.C. 154(b) by 0 days.

(21) Appl. No.: 14/434,701

(22) PCT Filed: Oct. 7, 2013

(86) PCT No.: PCT/JP2013/077203
§ 371 (c)(1),
(2) Date: Apr. 9, 2015

(87) PCT Pub. No.: WO2014/057899
PCT Pub. Date: Apr. 17, 2014

(65) Prior Publication Data
US 2015/0232634 A1  Aug. 20, 2015

(30) Foreign Application Priority Data
Oct. 12, 2012  (JP) ................. 2012-227375

(51) Int. Cl.
C08K 3/22 (2006.01)
C23C 26/00 (2006.01)
C08K 5/353 (2006.01)

(52) U.S. Cl.
CPC .............. C08K 3/22 (2013.01); C08K 5/353 (2013.01); C23C 26/00 (2013.01)

(58) Field of Classification Search
CPC .................................................. C08K 3/22
See application file for complete search history.

(56) References Cited

U.S. PATENT DOCUMENTS

| 5,349,168 A | 9/1994 | Wilen |
| 9,123,922 B2 | 9/2015 | Suzuta et al. |
| 2013/0209868 A1 | 8/2013 | Suzuta et al. |

FOREIGN PATENT DOCUMENTS

| JP | H06-100020 A | 4/1994 |
| JP | 2005-281863 A | 10/2005 |
| JP | 2007-246688 A | 9/2007 |
| JP | 2007246688 A * | 9/2007 |
| JP | 2008-183523 A | 8/2008 |
| JP | 2009-84516 A | 4/2009 |
| JP | 2009084516 A * | 4/2009 |
| JP | 2011-65834 A | 3/2011 |
| JP | 2011065834 A * | 3/2011 |
| JP | 2011-76735 A | 4/2011 |
| JP | 2011-187386 A | 9/2011 |
| JP | 2011-204674 A | 10/2011 |
| JP | 2012-116088 A | 6/2012 |
| WO | WO 2012/050182 A1 | 4/2012 |

OTHER PUBLICATIONS

Notification that the Japan Patent Office has received an Information Statement by a third party issued to Japanese Application No. 2012-227375 dated Feb. 2, 2016.

* cited by examiner

*Primary Examiner* — Lanee Reuther
(74) *Attorney, Agent, or Firm* — Knobbe, Martens, Olson & Bear LLP

(57) ABSTRACT

A surface treatment agent and a surface treatment method capable of imparting excellent corrosion resistance while enhancing adhesion between a surface of a metal substrate and a resin-containing layer. The surface treatment agent for treating a surface of a metal substrate includes an acrylic resin having a carboxyl group and a hydroxyl group, an oxazoline group-containing compound and metal particles containing at least one of Nb, Ca and Nd. The metal may be in the form of a niobium oxide sol.

3 Claims, No Drawings

SURFACE TREATMENT AGENT AND SURFACE TREATMENT METHOD

This application is the U.S. National Phase under 35 U.S.C. §371 of International Application PCT/JP2013/077203, filed Oct. 7, 2013, designating the U.S., and published in Japanese as WO 2014/057899 on Apr. 17, 2014, which claims priority to Japanese Patent Application No. 2012-227375, filed Oct. 12, 2012, the entire contents of which are incorporated herein by reference.

TECHNICAL FIELD

The present invention relates to a surface treatment agent and a surface treatment method for treating a surface of a metal substrate.

BACKGROUND ART

A surface of a metal substrate has hitherto been subjected to lamination processing so as to protect the surface of the metal substrate and to apply a design. A laminated film to be laminated on the surface of the metal substrate is excellent in processability, corrosion resistance, barrier properties of contents, and the like. Unlike a coating material, the laminated film is free from volatilization of an organic solvent, or the like, in the step of applying to the metal substrate, and is preferred in view of production environment. Therefore, the laminated film is widely used as protective materials of the surfaces of the metal substrates for packaging to be precoated in the form of a coil or a sheet, such as food cans, designed cans, capacitor cases, and battery members.

The laminated film has the above-mentioned excellent properties. However, in a material in which a surface of a metal substrate is subjected to lamination processing, a laminated film was sometimes peeled from the metal substrate, because of insufficient adhesion between the metal substrate and the laminated film, in the case of subjecting the laminated material to high-level processing as a packaging material, or in the case of adding contents to the packaging material after processing, and then subjecting to a heat treatment. Peeling of the laminated film from the metal substrate impaired aesthetic appearance of the laminated material to mainly cause deterioration of corrosion resistance of the laminated material.

To solve these problems in the laminated material, Patent Document 1 discloses technology in which a surface treatment layer is formed on a surface of a metal substrate using metal surface treatment composition prior to lamination processing to improve adhesion between the laminated film and the metal substrate. Patent Document 2 discloses, as a metal surface treatment composition used in a surface treatment with a surface treatment agent of an aluminum-based metal substrate, a metal surface treatment composition which contains a basic zirconium compound and/or a cerium compound, a carboxyl group-containing resin and an oxazoline group-containing acrylic resin, and is free from fluorine, and the document also discloses that it is possible to apply a metal material, in which an aluminum metal substrate treated with such metal surface treatment composition is subjected to lamination processing, for a battery outer casing.

Patent Documents 3 and 4 disclose that a material, in which a laminated film is bonded to a surface of a metal substrate, is used as a battery member for a lithium ion battery. As mentioned above, when using, as the battery member, the material in which a laminated film is bonded to a surface of a metal substrate, remarkably high adhesion between the laminated film and the metal substrate is required since it is necessary to sufficiently endure use over a long period. When using the above-mentioned material as the battery member, excellent corrosion resistance (particularly, hydrofluoric acid resistance and alkali resistance) are also required since the material is continuously exposed to an electrolytic solution.

[Patent Document 1] Japanese Unexamined Patent Application, Publication No. 2008-183523
[Patent Document 2] Japanese Unexamined Patent Application, Publication No. 2009-84516
[Patent Document 3] Japanese Unexamined Patent Application, Publication No. 2011-76735
[Patent Document 4] Japanese Unexamined Patent Application, Publication No. 2011-187386

DISCLOSURE OF THE INVENTION

Problems to be Solved by the Invention

However, in some of the laminated materials disclosed in Patent Documents 1 to 4, laminate adhesion is highly evaluated. However, all laminated materials were insufficient in corrosion resistance.

The present invention has been made so as to solve the above-mentioned problems, and an object thereof is to provide a surface treatment agent capable of imparting excellent corrosion resistance while enhancing adhesion between a resin-containing layer, such as a laminated film, and a surface of a metal substrate, and a surface treatment method.

Means for Solving the Problems

The present inventors have intensively studied so as to solve the above-mentioned problems. As a result, they have found that the above-mentioned problems can be solved by using a surface treatment agent containing an acrylic resin having a carboxyl group and a hydroxyl group, an oxazoline group-containing compound and specific metal particles in a surface treatment of a surface of a metal substrate, and thus completing the present invention.

To achieve the above-mentioned object, the present invention provides a surface treatment agent for treating a surface of a metal substrate, comprising: an acrylic resin having a carboxyl group and a hydroxyl group, an oxazoline group-containing compound and metal particles, wherein the metal particles are particles containing at least one metal selected from the group consisting of Nb, Ca and Nd.

The metal particles are preferably in the form of a niobium oxide sol.

The content of the metal particles is preferably from 0.05 to 2.5% by mass in terms of metal oxide based on the total amount of the surface treatment agent.

A mass ratio of the total amount of the content of the acrylic resin having a carboxyl group and a hydroxyl group and the content of the oxazoline group-containing compound to the content of the metal particles in terms of metal oxide [(the total amount of the content of the acrylic resin having a carboxyl group and a hydroxyl group and the content of the oxazoline group-containing compound)/(the content of the metal particles in terms of metal oxide)] is preferably from 0.4 to 7.5.

The present invention also provides a surface treatment method, which comprises applying the above-mentioned surface treatment agent onto a surface of a metal substrate to form a surface-treated film.

The surface-treated film preferably contains metal derived from the metal particles in the amount of 20 to 600 mg/m$^2$ in terms of metal oxide.

EFFECTS OF THE INVENTION

According to the present invention, it is possible to provide a surface treatment agent and a surface treatment method capable of imparting excellent corrosion resistance while enhancing adhesion between a resin-containing layer, such as a laminated film, and a surface of a metal substrate. The metal material treated with the surface treatment agent of the present invention can be preferably used as a metal member for a battery to which excellent hydrofluoric acid resistance and alkali resistance are required.

PREFERRED MODE FOR CARRYING OUT THE INVENTION

Embodiments of the present invention will be described below. The present invention is not limited to the following embodiments.

Surface Treatment Agent

A surface treatment agent for treating a surface of a metal substrate of the present embodiment comprises an acrylic resin having a carboxyl group and a hydroxyl group, an oxazoline group-containing compound and metal particles, and the metal particles contain at least one metal selected from the group consisting of Nb, Ca and Nd.

The metal substrate treated with the surface treatment agent of the present embodiment includes a film composed of a surface-treated film on a surface of a metal substrate. As used herein, "metal material" means a material in which a resin-containing layer, such as a resin film, is laminated on a surface-treated film of a metal substrate including a surface-treated film.

In the present embodiment, the surface-treated film formed on the metal substrate can be widely applied for a metal substrate which requires lamination processing because of having remarkably satisfactory adhesion with both the resin film and the metal substrate, and is particularly effective to enhance adhesion between a surface of a metal member for a battery and a resin film.

It is also possible to enhance corrosion resistance (particularly hydrofluoric acid resistance and alkali resistance required when the metal material is used as the member for a battery) of the metal substrate by formation of the above-mentioned film including a surface-treated film on a surface of the metal material.

[Metal Substrate]

The surface treatment agent of the present embodiment can be used in various metal substrates such as iron, SUS, aluminum, aluminum alloy, copper and copper alloy. The metal substrate can be used for various applications such as a can, a heat exchanger, and a metal member for a battery as long as a layer containing an organic resin is laminated on the surface-treated film. Particularly, the metal material can be preferably used for the metal member for a battery. The metal member for a battery is composed of metal used as battery members such as a packaging material and electrode for a battery, and examples thereof include members made of aluminum, aluminum alloy, copper, copper alloy, SUS, and the like. It is preferred to use, as the metal member for a battery, members of aluminum, aluminum alloy, copper and copper alloy since they have satisfactory processability and excellent in corrosion resistance, and also exhibit remarkably satisfactory adhesion with a resin film by using the surface treatment agent of the present embodiment. There is no particular limitation on the shape of the metal member for a battery, and the metal member for a battery can be formed into a desired shape depending on applications.

[Acrylic Resin having Carboxyl Group and Hydroxyl Group]

An acrylic resin having a carboxyl group is a resin including a repeating unit derived from a carboxyl group-containing (meth)acrylic monomer. Examples of the carboxyl group-containing (meth)acrylic monomer include, but are not particularly limited to, acrylic acid, methacrylic acid, crotonic acid, isocrotonic acid and maleic acid. These resins can be used alone, or two more resins can be used in combination.

Some of carboxyl groups contribute to formation of a dense surface-treated film by reacting with oxazoline groups of the below-mentioned oxazoline group-containing compound. The dense surface-treated film enhances hydrofluoric acid resistance and alkali resistance of the metal material. The carboxyl groups remaining in the surface-treated film contribute to an enhancement in adhesion between a surface-treated film and a resin film, adhesion between a surface-treated film and a surface of a metal substrate, and adhesion between a surface-treated film and a chemical conversion coating film.

The acrylic resin having a carboxyl group also has a hydroxyl group. The acrylic resin having a hydroxyl group is a resin including a repeating unit derived from a hydroxyl group-containing (meth)acrylic monomer. Examples of the hydroxyl group-containing (meth)acrylic monomer include, but are not particularly limited to, hydroxyethyl (meth)acrylate, hydroxypropyl (meth)acrylate, hydroxybutyl (meth)acrylate, allyl alcohol, methacrylic alcohol, an adduct of hydroxyethyl (meth)acrylate and c-caprolactone, and the like. These hydroxyl group-containing (meth)acrylic monomers can be used alone, or two or more hydroxyl group-containing (meth)acrylic monomers can be used in combination.

When the acrylic resin has both a carboxyl group and a hydroxyl group, the carboxyl group and the hydroxyl group are hydrogen-bonded to each other in a surface-treated film, and thus contributing to formation of a more dense surface-treated film.

The acrylic resin having a carboxyl group and a hydroxyl group preferably has a weight molecular weight of 2,000 to 100,000.

The acrylic resin having a carboxyl group and a hydroxyl group preferably has an acid value, as the resin solid content, of 400 to 750 mgKOH/g, and more preferably 500 to 650 mgKOH/g. When the acid value satisfies the above-mentioned range, not only adhesion between a laminated film and a resin-containing layer, but also adhesion between a surface of a metal substrate and a chemical conversion coating film becomes satisfactory.

The acrylic resin having a carboxyl group and a hydroxyl group preferably has a hydroxyl value of 50 to 200 mgKOH/g, and more preferably 70 to 120 mgKOH/g. When the hydroxyl value satisfies the above-mentioned range, not only adhesion with a resin-containing layer, such as a laminated film, but also adhesion with a surface of a metal substrate or a chemical conversion coating film becomes satisfactory.

[Oxazoline Group-Containing Compound]

The oxazoline group-containing compound is not particularly limited as long as it has an oxazoline group. Namely, the oxazoline group-containing compound is not particularly limited as long as it is a compound having a plurality of oxazoline groups in the molecule, and it is possible to use, for example, an oxazoline group-containing resin in which a main chain is an acryl skeleton, an oxazoline group-containing resin in which a main chain is a styrene/acryl skeleton, an oxazoline group-containing resin in which a main chain is a styrene skeleton, an oxazoline group-containing resin in which a main chain is an acrylonitrile/styrene skeleton, and the like. In the present embodiment, it is preferred to use an oxazoline group-containing resin in which a main chain is an acryl skeleton. It is possible to use, as the oxazoline group-containing acrylic resin, commercially available acrylic resins, for example, "Epocross WS300" (trade name, manufactured by Nippon Shokubai Co., Ltd.), "Epocross WS500" (trade name, manufactured by Nippon Shokubai Co., Ltd.), "Epocross WS700" (trade name, manufactured by Nippon Shokubai Co., Ltd.), and "NK Linker FX" (trade name, manufactured by Shin Nakamura Chemical Co., Ltd.). When using an oxazoline group-containing resin as the oxazoline group-containing compound, an oxazoline value of the oxazoline group-containing resin is preferably from 120 to 240 g (solid content)/equivalent. The oxazoline value (g (solid content)/equivalent) is defined as resin mass per mol of an oxazoline group.

The oxazoline group of the oxazoline group-containing compound contributes to formation of a dense surface-treated film by reacting with the carboxyl group of the above-mentioned acrylic resin having a carboxyl group and a hydroxyl group, and thus enabling an improvement in corrosion resistance (particularly hydrofluoric acid resistance and alkali resistance) of the metal material. The oxazoline group remaining in the surface-treated film contributes to an improvement in adhesion between a resin-containing layer, such as a laminated film, and a surface-treated film.

[Metal Particles]

The metal particles are particles which contain metal (element) as metal simple substance, or a metal compound such as metal oxide or metal hydroxide, or a mixture thereof.

The metal particles contained in the surface treatment agent according to the present embodiment are particles containing at least one metal (element) selected from Nb, Ca and Nd. When the metal particles are contained in the surface treatment agent, corrosion resistance (particularly hydrofluoric acid resistance and alkali resistance) of the metal material is improved. It is estimated that this effect is exerted by rust-proofness of metal particles per se, or forming inorganic crosslinking as a result of a reaction of the metal particles with an acrylic resin having a carboxyl group and a hydroxyl group or an oxazoline group-containing compound. It is possible to use, as the metal particles, plural types of metal particles in combination.

The metal particles having a number average particle diameter of 5 to 500 nm, as the size, are preferred since they can exist in a state of being stably dispersed in a surface treatment agent. It is possible to use, as the shape of the metal particles, any shape such as true sphere, nearly sphere, scale, needle, foil or plate as long as the shape is suited for the object of the present invention. The number average particle diameter of the metal particles can be measured based on a dynamic light scattering method.

The metal particles are preferably metal particles composed of metal oxide in view of ease of handling and availability. The metal particles are preferably particles containing Nb, and more preferably in the form of a niobium oxide sol since corrosion resistance (particularly hydrofluoric acid resistance and alkali resistance) of the metal material can be improved.

In order to enhance adhesion between the surface-treated film and the metal substrate, and adhesion between the surface-treated film and the resin-containing layer, such as a laminated film, thereby to enhance corrosion resistance (particularly hydrofluoric acid resistance and alkali resistance) of the metal material, the surface treatment agent is allowed to contain the above-mentioned metal particles. Furthermore, the content of each component of the surface treatment agent is preferably adjusted within the below-mentioned range.

The content of an acrylic resin having a carboxyl group and a hydroxyl group based on the content of the entire solid component in the surface treatment agent is preferably within a range from 10 to 80% by mass from the viewpoint of being capable of enhancing the effects of the present embodiment. The content of the acrylic resin having a carboxyl group and a hydroxyl group is more preferably from 15 to 75% by mass, and still more preferably from 40 to 70% by mass.

The content of the oxazoline group-containing compound based on the content of entire solid component in the surface treatment agent is preferably within a range from 1 to 40% by mass from the viewpoint of being capable of enhancing the effects of the present embodiment. The content of the oxazoline group-containing compound is more preferably from 5 to 35% by mass, and still more preferably from 5 to 15% by mass.

A mass ratio of the solid content of an acrylic resin having a carboxyl group and a hydroxyl group to the solid content of an oxazoline group-containing compound (acrylic resin having a carboxyl group and a hydroxyl group/oxazoline group-containing compound) in the surface treatment agent is preferably from 0.5 to 10 from the viewpoint of being capable of enhancing the effects of the present embodiment. The above-mentioned mass ratio of the solid content (acrylic resin having a carboxyl group and a hydroxyl group/oxazoline group-containing compound) is preferably from 0.5 to 5.

The content of the metal particles in the surface treatment agent is preferably from 0.05 to 3.5% by mass in terms of metal oxide based on the total amount of the surface treatment agent from the viewpoint of being capable of enhancing adhesion between a resin-containing layer, such as a laminated film, and a surface of a metal substrate, and also imparting high corrosion resistance (particularly hydrofluoric acid resistance and alkali resistance) to the metal material. The content of the metal particles is more preferably from 0.05 to 2.5% by mass, and still more preferably from 0.1 to 1.5% by mass.

A mass ratio of the total amount of the content of the acrylic resin having a carboxyl group and a hydroxyl group and the content of the oxazoline group-containing compound to the content of the metal particles in terms of metal oxide [(the total amount of the content of the acrylic resin having a carboxyl group and a hydroxyl group and the content of the oxazoline group-containing compound)/(the content of the metal particles in terms of metal oxide)] in the surface treatment agent is preferably from 0.1 to 10 from the viewpoint of being capable of enhancing adhesion between a resin-containing layer, such as a laminated film, and a surface of a metal substrate, and also imparting high corrosion resistance (particularly hydrofluoric acid resistance and alkali resistance) to the metal material. The mass ratio [(the total amount of the content of the acrylic resin having a carboxyl group and a hydroxyl group and the content of the oxazoline group-containing compound)/(the content of metal particles in terms of metal oxide)] is more preferably from 0.4 to 7.5.

The content of the entire solid component of the surface treatment agent is preferably from 0.05 to 8% by mass from the viewpoint of being capable of further enhancing the above-mentioned effects. The content of the entire solid component of the surface treatment agent is preferably from 0.6 to 5% by mass. The surface treatment agent can contain, as components other than the above-mentioned components, for example, catalysts, viscosity adjusters, antimicrobial agents, surfactants, defoaming agents, rust preventive agents, and the like, as long as the effects of the present embodiment are not impaired.

[Chemical Conversion Treatment]

A chemical conversion coating film can be formed on a surface of a metal substrate by performing chemical conversion treatment using a chemical conversion treatment agent containing zirconium, vanadium and aluminum before a surface treatment of the metal substrate using the surface treatment agent according to the present invention. As mentioned above, a multilayer film composed of a chemical conversion coating film and a surface-treated film is formed on a surface of a metal substrate by performing a surface treatment after Performing a chemical conversion treatment of the surface of the metal substrate.

The chemical conversion treatment agent used in the case of performing a chemical conversion treatment before performing a surface treatment of the metal substrate using the surface treatment agent according to the present embodiment contains zirconium, vanadium and aluminum ions, and the content of zirconium ions in the chemical conversion treatment agent is preferably from 50 to 20,000 ppm by mass, more preferably from 100 to 10,000 ppm by mass, and still more preferably from 200 to 10,000 ppm by mass, in terms of metal. The content of vanadium ions is preferably from 10 to 20,000 ppm by mass, more preferably from 50 to 10,000 ppm by mass, and still more preferably from 100 to 8,000 ppm by mass, in terms of metal. Zirconium, vanadium and aluminum contained in the chemical conversion treatment agent exist in the form of various ions including complex ions and the like. Therefore, as used herein, the respective contents of zirconium, titanium and vanadium means the values in terms of metal element of various ions.

Zirconium ions undergo a change depending on a chemical reaction, thereby, a zirconium precipitate composed mainly of zirconium hydroxide is formed on a surface of a metal substrate. Examples of a zirconium compound as a source of zirconium ions include, in addition to zirconium compounds such as fluorozirconic acid and zirconium fluoride, salts such as lithium, sodium, potassium and ammonium thereof. It is also possible to use those prepared by dissolving the zirconium compound such as zirconium hydroxide in a fluoride such as hydrofluoric acid. In the case of containing fluorine, like these zirconium compounds, these compounds have a function of etching a surface of a metal substrate.

A chemical conversion coating film containing vanadium, together with zirconium, is formed by including zirconium ions and vanadium ions in the chemical conversion treatment agent. It is possible to use, as a vanadium compound which is a source of a vanadium element, vanadium compounds in which vanadium has two to five valences. Specific examples thereof include metavanadic acid, ammonium metavanadate, sodium metavanadate, vanadium pentoxide, vanadium oxytrichloride, vanadyl sulfate, vanadyl nitrate, vanadyl phosphate, vanadium oxide, vanadium dioxide, vanadium oxyacetylacetonate, vanadium chloride, and the like.

When the chemical conversion treatment agent contains vanadium ions, a vanadium precipitate composed mainly of vanadium oxide is formed on a surface of a metal substrate. More specifically, vanadium ions are converted into vanadium oxide through a reduction reaction, thereby, a vanadium precipitate is formed on the surface of the metal substrate.

Unlike the zirconium precipitate having properties capable of entirely coating the surface of the metal substrate, except for some parts of the surface, the vanadium precipitate has properties capable of being likely to precipitate on the segregation products on which the zirconium precipitate is less likely to be formed of the surface of the metal substrate. Thereby, zirconium precipitate and vanadium precipitate enable formation of a chemical conversion coating film which is dense and has high coatability.

The chemical conversion treatment agent contains aluminum ions. In case the metal substrate to be treated is aluminum, aluminum ions also elute in the chemical conversion treatment agent from the metal substrate. A chemical conversion treatment reaction can be accelerated by positively adding aluminum ions. Examples of the source of aluminum ions include aluminates such as aluminum nitrate, aluminum sulfate, aluminum fluoride, aluminum oxide, alum, aluminum silicate and sodium aluminate; and fluoroaluminum salts such as sodium fluoroaluminate.

As mentioned above, in the chemical conversion treatment agent, the content of zirconium ions is preferably from 50 to 20,000 ppm by mass, more preferably from 100 to 10,000 ppm by mass, and still more preferably from 200 to 10,000 ppm by mass, in terms of metal. The content of vanadium ions is preferably from 10 to 20,000 ppm by mass, more preferably from 50 to 10,000 ppm by mass, and still more preferably from 100 to 8,000 ppm by mass, in terms of metal. Use of a chemical conversion coating film formed of a chemical conversion treatment agent, which satisfies these conditions and contains the above-mentioned components, in combination with the above-mentioned surface-treated film enables sufficient enhancement in adhesion between a surface of a metal substrate and a resin-containing layer, such as a laminated film, and thus sufficiently enhancing corrosion resistance (particularly hydrofluoric acid resistance and alkali resistance) of the metal material.

The content of aluminum ions is preferably from 50 to 1,000 ppm by mass. The content of aluminum ions is more preferably from 100 to 500 ppm by mass.

The chemical conversion treatment agent can contain free fluorine ion. Free fluorine ions accelerate etching of a surface of an aluminum metal in an initial stage.

Examples of the source of free fluorine ions include hydrofluoric acids and salts thereof such as hydrofluoric acid, ammonium hydrogen fluoride, zirconiumhydrofluoric acid and titaniumhydrofluoric acid; metal fluorides such as sodium fluoride, aluminum fluoride, zirconium fluoride and titanium fluoride; ammonium fluoride, and the like. In case zirconium fluoride or aluminum fluoride is used as a source of free fluorine ions, these compounds also serve as a source of zirconium ions or aluminum ions.

In case the metal substrate is aluminum and free fluorine ions are contained in the chemical conversion treatment agent, free fluorine ions are bound with aluminum precipitated from a surface of aluminum metal to form aluminum fluoride. Continuous chemical conversion treatment of aluminum metal causes a gradual increase in the content of aluminum fluoride in the chemical conversion treatment agent. If the chemical conversion treatment agent contains no aluminum fluoride before the chemical conversion treatment, a state of the chemical conversion treatment agent largely varies as a chemical conversion treatment of a surface of aluminum metal surface is continuously performed, and thus this change may suppress the formation of a stable chemical conversion coating film. Therefore, it is preferred that the surface treatment agent is allowed to contain aluminum fluoride serving as a source of free fluorine ions and aluminum ions.

The chemical conversion treatment agent can contain components other than the above-mentioned components as long as the effects of the present embodiment are not impaired. The chemical conversion treatment agent can contain, for example, metal ions of manganese, zinc, cerium, tri-valent chromium, magnesium, strontium, calcium, tin, copper and iron; rust preventive agents, for example, phosphorus compounds such as phosphonic acid, phosphoric acid and condensed phosphoric acid; polycarboxylic acid compounds such as polyacrylic acid, an acrylic acid-maleic acid copolymer and a carboxyl group-containing acrylic resin; polyamine compounds such as polyvinylamine and polyallylamine; and various silane coupling agents such as aminosilane and epoxysilane.

It is also possible to use the chemical conversion treatment agent, which is used in the case of performing a chemical conversion treatment before performing a surface treatment using the surface treatment agent according to the present embodiment, as a chemical conversion treatment agent of the type in which, in case a surface of a metal substrate is subjected to a chemical conversion treatment, a change in pH occurs near the surface due to a etching reaction thereby to precipitate a component, which would serve as a chemical treated film, and thus forming a chemical treated film (sometimes called a "reaction type chemical conversion treatment agent"). It is also possible to use the chemical conversion treatment agent as a chemical conversion treatment agent of the type in which a chemical treated film is formed on a surface of a metal substrate by applying on the surface of the metal substrate, followed by drying (sometimes called a "coating type chemical conversion treatment agent").

The chemical conversion treatment agent preferably has a pH of 1 to 6. When the pH is 1 or higher, the chemical conversion coating film can be formed without causing excess etching due to the chemical conversion treatment agent. When the pH is 6 or lower, sufficient amount of a chemical conversion coating film can be formed without causing insufficient etching. The pH of the chemical conversion treatment agent can be adjusted by using a common acid or alkali, such as sulfuric acid, nitric acid, organic acid, ammonia or an amine compound.

The method of chemical conversion treatment is not particularly limited and can be any method such as a spraying method, a dipping method, a roll coating method or a bar coating method. The temperature of the chemical conversion treatment agent is preferably from 5 to 70° C. When using as the reaction type chemical conversion treatment agent, the time of the chemical conversion treatment is preferably from 5 to 300 seconds, and more preferably from 10 to 120 seconds. After the chemical conversion treatment, followed by washing with water, a surface treatment as the subsequent step can be performed, or the surface treatment can also be performed without performing washing with water.

In case the chemical conversion treatment was performed, a chemical conversion coating film is preferably heated and dried before performing the surface treatment as the subsequent step. The heating/drying temperature is preferably from 40 to 280° C., and more preferably from 80 to 180° C. The heating/drying time is, preferably from 10 to 300 seconds, and more preferably from 30 to 150 seconds. It is possible to form an excellent chemical conversion coating film by satisfying these chemical conversion treatment conditions and heating/drying conditions.

[Surface Treatment Method]

There is no particular limitation on the method in which a surface treatment agent is applied on a surface of a metal substrate without forming a chemical conversion coating film or after forming the chemical conversion coating film. Examples of the method include a roll coating method, a bar coating method, a spraying treatment method and a dipping treatment method. After the metal substrate is subjected to a surface treatment using any one of the below-mentioned surface treatment agents to form a surface-treated film on a surface of the metal substrate, a surface-treated film of a metal substrate is dried by heating at 40 to 160° C. for 2 to 60 seconds. A metal substrate with a surface-treated film can be obtained by drying.

The surface-treated film preferably contains metal derived from the metal particles in the amount of 5 to 700 mg/m$^2$ in terms of metal oxide. "In terms of metal oxide" means that mass of metal (element) is converted into mass of metal oxide on the assumption that the entire metal (element) in metal particles is metal oxide. Adjustment of the content of metal particles in the surface-treated film within the above-mentioned range enables enhancement in adhesion between an organic resin layer, such as a laminated film, and a surface of a metal substrate, and thus imparting high hydrofluoric acid resistance and alkali resistance to the metal material. The surface-treated film more preferably contains metal derived from the metal particles in the amount of 20 to 600 mg/m$^2$, and still more preferably, 25 to 350 mg/m$^2$ in terms of metal oxide. Control of a viscosity of a surface treatment agent enables adjustment of the amount of the surface-treated film.

[Resin-Containing Layer]

Examples of the organic resin forming the resin-containing layer include, but are not particularly limited to, organic resins such as polyethylene terephthalate (PET), polyethylene naphthalate (PEN), polypropylene (PP), polycarbonate (PC), polyphenylene sulfide (PPS), triacetyl cellulose (TAC), polyvinyl chloride (PVC), polyvinyl alcohol (PVA), polyester, polyolefin, polyurethane, nylon and acryl. The resin-containing layer can be formed by applying a coating liquid containing an organic resin on a surface-treated film, or attaching a laminated film containing an organic resin onto a surface-treated film.

Examples of the method of applying a coating liquid containing an organic resin on a surface-treated film include, but are not limited to, a spraying method, a dipping method, a roll coating method, and a bar coating method.

Examples of the method of attaching a laminated film onto a surface-treated film include, but are not particularly limited to, a dry lamination processing method and an extrusion lamination processing method.

[Metal Material]

A metal material is that in which an organic resin layer, such as a laminated film, is formed on a surface-treated film of a metal substrate. As mentioned above, this metal material is excellent in adhesion between a surface-treated film and an organic resin layer, such as a laminated film, and adhesion between a surface-treated film and a metal substrate, resulting in high adhesion between a surface of a metal substrate and an organic resin layer, such as a laminated film. As mentioned above, because of the surface-treated film formed on a surface of a metal substrate, the metal material has remarkably high corrosion resistance (particularly hydrofluoric acid resistance and alkali resistance).

Because of high adhesion between a surface of a metal substrate and an organic resin layer, such as a laminated film, and excellent hydrofluoric acid resistance and alkali resistance of the metal material, the above-mentioned metal material can be preferably used as a battery member. The battery member is, for example, a packaging material or electrode for a lithium ion battery. In a lithium ion battery (particularly a lithium ion battery for automobile), high-level adhesion (adhesion between a laminated film and a metal substrate) and corrosion resistance are required to a packaging material from the viewpoint of safety. Also in an electrode for a lithium ion battery, one surface of metal for an electrode may be sometimes subjected to a surface treatment, followed by attachment of a laminated film. In that case, high-level adhesion and corrosion resistance are also required.

In the lithium ion battery, an alkali electrolyte may be sometimes used as the electrolyte from the viewpoint of stably operating a battery. Since the alkali electrolyte usually has strong corrosiveness, remarkably high alkali resistance is required to a packaging material and electrode for a lithium ion battery. The metal material produced by the present invention can be preferably used as a packaging material and electrode for a lithium ion battery, using an alkali electrolyte because of remarkably high alkali resistance.

In the lithium ion battery, a solution prepared by dissolving an electrolyte in an aprotic solvent such as propylene carbonate, ethylene carbonate, dimethyl carbonate, diethyl carbonate or ethyl methyl carbonate is used as the electrolytic solution. $LiPF_6$, $LiBF_4$, and the like are sometimes used as a lithium salt of the electrolyte. These lithium salts enable the generation of hydrofluoric acid by hydrolysis. Since hydrofluoric acid has strong corrosiveness, remarkably high hydrofluoric acid resistance is required to a packaging material and electrode for a lithium ion battery. The metal material produced by the present invention can be preferably used in the above-mentioned packaging material or electrode for a lithium ion battery, using a lithium salt, because of its remarkably high hydrofluoric acid resistance.

EXAMPLES

The present invention will be described in detail below by way of Examples, but the present invention is not limited thereto. Unless otherwise specified, all parts, percentages and ppm(s) are by mass.

[Preparation of Chemical Treatment Agent]

Using a conventionally known preparation method, the respective components were mixed in accordance with the formulation such that the contents of zirconium ions, vanadium ions and aluminum ions in a chemical conversion treatment agent are as shown in Tables 3 and 7 (each unit of the numerical values in the tables is ppm by mass) to prepare chemical conversion treatment agents of Examples 21 to 36, and Examples 44 to 49. With regard to Examples 27 to 32, 35, 36, 46, 47 and 49, components were mixed in accordance with the formulation such that the content of polyacrylic acid (PAA) is as shown in Tables 3 and 7, in addition to zirconium ions, vanadium ions and aluminum ions. Fluorozirconic acid was used as a zirconium source, a vanadyl sulfate was used as a vanadium source, and an aluminum fluoride was used as an aluminum source.

[Chemical Treatment]

With regard to Examples 21 to 26, 33 and 34, a chemical conversion treatment was carried out by dipping a 0.28 mm thick aluminum alloy 3004 plate material (manufactured by Nippon Test Panel Co., Ltd., "aluminum" in the table) in the chemical conversion treatment agent prepared as mentioned above at 50° C. for 60 seconds, followed by washing with water. With regard to Examples 27 to 32, 35 and 36, a chemical conversion treatment was carried out by dipping a 0.28 mm thick aluminum alloy 3004 plate material (manufactured by Nippon Test Panel Co., Ltd., "aluminum" in the table) in the chemical conversion treatment agent prepared as mentioned above at 30° C. for 60 seconds, and then drying was carried out at 100° C. for 60 seconds without washing with water. With regard to Examples 44, 45 and 48, a chemical conversion treatment was carried out by dipping a 0.5 mm thick copper plate material C1020P (manufactured Nippon Test Panel Co., Ltd., "copper" in the table) in the chemical conversion treatment agent prepared as mentioned above at 50° C. for 60 seconds and washing with water and, after the chemical conversion treatment, drying was carried out at 100° C. for 60 seconds. With regard to Examples 46, 47 and 49, a chemical conversion treatment was carried out by dipping a 0.5 mm thick copper plate material C1020P (manufactured Nippon Test Panel Co., Ltd., "copper" in the table) in the chemical conversion treatment agent prepared as mentioned above at 30° C. for 60 seconds and, after the chemical conversion treatment, drying was carried out at 100° C. for 60 seconds without washing with water.

[Preparation of Surface Treatment Agent]

Using a conventionally known preparation method, the respective components were mixed in accordance with the formulation such that the contents of an acrylic resin having a carboxyl group and a hydroxyl group, an oxazoline group-containing compound, and metal particles are as shown in Tables 1, 3, 5 and 7 to prepare surface treatment agents of Examples 1 to 49 and Comparative Examples 1 to 8. Each of the content of the acrylic resin, the content of the oxazoline group-containing compound, and the content of the metal particles in the table is the content based on the total amount of the surface treatment agent, and unit is % by mass. The total of these numerical values is the concentration of the entire solid content. The content of the metal particles in the table is the content of the metal particles in terms of metal oxide. As the acrylic resin having a carboxyl group and a hydroxyl group ("resin" in the table), "EMA1012" (carboxyl group and hydroxyl group-containing acrylic resin, manufactured by Nippon Paint Co., Ltd., acid value of 521 mgKOH/g, hydroxyl value of 86 mgKOH/g and molecular weight of 95,000 as the resin solid content) was used. As the oxazoline group-containing compound ("oxazoline" in the table), "Epocross WS300" (oxazoline group-containing acrylic resin which is a copolymerization type of a (meth)acrylic acid alkyl ester, manufactured by Nippon Shokubai Co., Ltd., oxazoline value of 130 g (solid content)/equivalent) was used. As the metal particles, those disclosed in Tables 1, 3, 5 and 7 were used. As niobium, a niobium sol having a solid content concentration of 10% and a dispersed particle diameter of 15 nm (product name; BIRAL Nb series, manufactured by TAKI CHEMICAL CO., LTD.) was used. As calcium, an appetite sol having a solid content concentration of 15% and a dispersed particle diameter of 20 nm (product name; Apatite Colloid, manufactured by Nippon Chemical Industries Co., Ltd.) was used. As neodymium, a neodymium sol having a solid content concentration of 10% and a dispersed particle diameter of 20 nm (product name; BIRAL Nd series, manufactured by TAKI CHEMICAL CO., LTD.) was used. As cerium, a cerium sol having a solid content concentration of 10% and a dispersed particle diameter of 20 nm (product name; Needral series, manufactured by TAKI CHEMICAL CO., LTD.) was used. As zirconium, a zirconium sol having a solid content concentration of 20% and a dispersed particle diameter of 20 nm (product name; BIRAL Zr series, manufactured by TAKI CHEMICAL CO., LTD.) was used.

[Surface Treatment]

In Examples 1 to 20 and Comparative Examples 1 to 5, an aluminum alloy plate was directly dipped in the surface treatment agent prepared as mentioned above at room temperature for 10 seconds. In Examples 21 to 36, an aluminum alloy plate subjected to a chemical conversion treatment was dipped in the surface treatment agent at room temperature for 10 seconds. In Examples 37 to 43 and Comparative Examples 6 to 8, a copper plate was directly dipped in the surface treatment agent at room temperature for 10 seconds. In Examples 44 to 49, a copper plate subjected to a chemical conversion treatment was dipped in the surface treatment agent at room temperature for 10 seconds. Thus, a surface treatment was applied. Then, the aluminum alloy plate and the copper plate, subjected to the surface treatment, were subjected to a baking treatment in a drying furnace for 5 minutes at a temperature such that each temperature of the aluminum alloy plate or copper plate per se becomes 150° C., to prepare an aluminum alloy plate and a copper plate (test plate), each being equipped with a surface-treated film.

[Amount of Metal Oxide]

The amount of metal oxide in the surface-treated film formed on a surface of each of test plates produced in Examples 1 to 49 and Comparative Examples 1 to 8 was calculated from the measurement results of an X-ray fluorescence spectrometer "XRF-1700" (manufactured by Shimadzu Corporation). The results are shown in Tables 2, 4, 6 and 8.

[Production of Metal Material]

After applying a surface treatment in Examples 1 to 49 and Comparative Examples 1 to 8, "MELINEX 850" (PET film, manufactured by ICI Japan Co., Ltd., film thickness of 15 μm) was contact-bonded to each of test plates at 150° C. and a roll speed of 30 m/minute, using a heating roller. Using a conveyor type oven, the film-attached plate was reheated at 240° C. for 20 seconds. Immediately after taking out of the oven, the plate was water-cooled.

[Measurement of Adhesion Force]

A test plate was cut so as to obtain two metal plates each measuring 150 mm×50 mm. These metal plates were laid one upon another while facing resin films, followed by contact bonding at 240° C. under 7 kgf/cm$^2$ for 60 seconds, using a hot press. Films were completely melted and bonded with each other by this operation. The contact-bonded metal plate was cut into pieces measuring 150 mm×5 mm to obtain a test piece. Using "TENSILON testing machine" (trade name, manufactured by Toyo Baldwin Co.)), a peel strength (kgf/5 mm in width) applied in the case of peeling the film surface of the test piece was measured. This is an initial adhesion force. The results are shown in Tables 2, 4, 6 and 8.

The contact-bonded metal plate was cut into pieces measuring 150 mm×5 mm to obtain new test pieces. The obtained test pieces were placed in an autoclave and then subjected to a heat treatment in a pressure steam at 125° C. for 30 minutes (retort treatment). Using "TENSILON testing machine" (trade name, manufactured by Toyo Baldwin Co.)), a peel strength (kgf/5 mm in width) applied in the case of peeling the film surface of the test piece subjected to a retort treatment was measured. This is a secondary adhesion force. The results are shown in Tables 2, 4, 6 and 8.

[Hydrofluoric Acid Resistance]

A metal material was formed into a cup (27 mm in diameter, 17 mm in height) such that a surface of a resin film of the metal material faces outside. This cup was dipped in a hydrofluoric acid solution (containing HF in the concentration of 18 g/L) maintained at 80° C. for 2 weeks, and then hydrofluoric acid resistance of the metal material was evaluated by visually observing a state where a resin film remains, in accordance with the following four rank criteria. The results are shown in Tables 2, 4, 6 and 8.

"A": 90% or more of resin film remains

"B": 70% or more and less than 90% of resin film remains.

"C": 50% or more and less than 70% of resin film remains.

"D": Less than 50% of resin film remains.

[Alkali Resistance]

A metal material was dipped in an aqueous LiOH solution (0.5 mol %, pH of 11) at 40° C. for 10 seconds, and then alkali resistance of the metal material was evaluated by visually observing a state where a resin film remains, in accordance with the following four rank criteria. The results are shown in Tables 2, 4, 6 and 8.

"A": No surface whitening is observed, and 80% or more of resin film remains.

"B": Surface whitening is observed, and 80% or more of resin film remains.

"C": Surface whitening is observed, and 60% or more and less than 80% of resin film remains.

"D": Surface whitening is observed, and less than 60% of resin film remains.

TABLE 1

| | | Surface treatment | | | |
|---|---|---|---|---|---|
| | | | | Metal particles | |
| | Metal Substrate | Resin | Oxazoline | Metal species | Mixing amount (%) |
| Example 1 | Aluminum | 0.5 | 0.1 | Nb | 3.00 |
| Example 2 | Aluminum | 0.5 | 0.1 | Nb | 1.50 |
| Example 3 | Aluminum | 0.5 | 0.1 | Nb | 0.60 |
| Example 4 | Aluminum | 0.5 | 0.1 | Nb | 0.30 |
| Example 5 | Aluminum | 0.5 | 0.1 | Nb | 0.12 |
| Example 6 | Aluminum | 0.75 | 0.15 | Nb | 0.12 |
| Example 7 | Aluminum | 0.5 | 0.1 | Nb | 0.065 |
| Example 8 | Aluminum | 2.0 | 0.4 | Nb | 2.40 |
| Example 9 | Aluminum | 1.2 | 0.24 | Nb | 1.44 |
| Example 10 | Aluminum | 0.15 | 0.03 | Nb | 0.18 |
| Example 11 | Aluminum | 0.5 | 0.05 | Nb | 0.55 |
| Example 12 | Aluminum | 0.5 | 0.5 | Nb | 1.00 |
| Example 13 | Aluminum | 0.5 | 1 | Nb | 1.50 |
| Example 14 | Aluminum | 0.5 | 0.1 | Ca | 0.60 |
| Example 15 | Aluminum | 0.5 | 0.1 | Nd | 0.60 |
| Example 16 | Aluminum | 2.5 | 0.5 | Nb | 3.00 |
| Example 17 | Aluminum | 0.025 | 0.005 | Nb | 0.03 |
| Example 18 | Aluminum | 0.1 | 0.02 | Nb | 0.06 |
| Example 19 | Aluminum | 0.25 | 0.05 | Nb | 2.00 |
| Example 20 | Aluminum | 2.0 | 0.4 | Nb | 2.60 |
| Comparative Example 1 | Aluminum | 0.5 | 0.1 | — | — |
| Comparative Example 2 | Aluminum | 0 | 0.1 | Nb | 0.10 |
| Comparative Example 3 | Aluminum | 0.5 | 0 | Nb | 0.50 |

TABLE 1-continued

|  | | Surface treatment | | | |
|---|---|---|---|---|---|
|  | | | | Metal particles | |
|  | Metal Substrate | Resin | Oxazoline | Metal species | Mixing amount (%) |
| Comparative Example 4 | Aluminum | 0.5 | 0.1 | Zr | 0.60 |
| Comparative Example 5 | Aluminum | 0.5 | 0.1 | Ce | 0.60 |

TABLE 2

|  | Resin + Oxazoline/ Metal particles | Amount of metal oxide (mg/m$^2$) | Adhesion (kgf/cm$^2$) | | Corrosion resistance | |
|---|---|---|---|---|---|---|
|  |  |  | Initial adhesion | Secondary adhesion | Hydrofluoric acid resistance | Alkali resistance |
| Example 1 | 0.20 | 680 | 1.5 | 1.0 | C | C |
| Example 2 | 0.40 | 340 | 2.5 | 2.0 | A | A |
| Example 3 | 1.00 | 136 | 2.5 | 2.0 | A | A |
| Example 4 | 2.00 | 68 | 2.5 | 2.0 | A | A |
| Example 5 | 5.00 | 27 | 2.5 | 2.0 | A | A |
| Example 6 | 7.50 | 27 | 2.5 | 2.0 | A | A |
| Example 7 | 9.23 | 15 | 3.0 | 2.5 | B | C |
| Example 8 | 1.00 | 544 | 2.5 | 2.0 | A | B |
| Example 9 | 1.00 | 326 | 2.5 | 2.0 | A | A |
| Example 10 | 1.00 | 41 | 2.5 | 2.0 | A | B |
| Example 11 | 1.00 | 125 | 1.0 | 0.5 | A | B |
| Example 12 | 1.00 | 227 | 2.0 | 1.5 | A | A |
| Example 13 | 1.00 | 340 | 2.0 | 1.5 | A | A |
| Example 14 | 1.00 | 136 | 2.0 | 1.5 | A | A |
| Example 15 | 1.00 | 136 | 2.0 | 1.5 | A | A |
| Example 16 | 1.00 | 680 | 2.0 | 1.5 | B | B |
| Example 17 | 1.00 | 7 | 1.5 | 1.0 | C | B |
| Example 18 | 2.00 | 13 | 2.5 | 2.0 | B | C |
| Example 19 | 0.15 | 453 | 1.5 | 1.0 | C | C |
| Example 20 | 0.92 | 589 | 2.0 | 1.5 | B | B |
| Comparative Example 1 | — | — | 3.0 | 2.0 | D | D |
| Comparative Example 2 | 1.00 | 23 | 1.0 | 0.5 | D | D |
| Comparative Example 3 | 1.00 | 113 | 1.0 | 0.5 | D | D |
| Comparative Example 4 | 1.00 | 136 | 2.0 | 1.5 | D | C |
| Comparative Example 5 | 1.00 | 136 | 2.0 | 1.5 | D | C |

TABLE 3

|  | Chemical conversion treatment (Pre-treatment) | | | | Surface treatment (Post-treatment) | | | |
|---|---|---|---|---|---|---|---|---|
|  | Metal Substrate | Zr (ppm) | V (ppm) | Al (ppm) | PAA (ppm) | Resin | Oxazoline | Metal particles |
|  |  |  |  |  |  |  |  | Metal species | Mixing amount (%) |
| Example 21 | Aluminum | 1000 | 300 | 150 | — | 0.5 | 0.1 | Nb | 0.60 |
| Example 22 | Aluminum | 1000 | 300 | 150 | — | 0.5 | 0.1 | Nb | 0.12 |
| Example 23 | Aluminum | 1000 | 300 | 150 | — | 2.0 | 0.4 | Nb | 2.40 |
| Example 24 | Aluminum | 1000 | 300 | 150 | — | 1.2 | 0.24 | Nb | 1.44 |
| Example 25 | Aluminum | 1000 | 300 | 150 | — | 0.5 | 0.5 | Nb | 1.00 |
| Example 26 | Aluminum | 1000 | 300 | 150 | — | 0.5 | 1 | Nb | 1.50 |
| Example 27 | Aluminum | 10000 | 8000 | 500 | 10000 | 0.5 | 0.1 | Nb | 0.60 |
| Example 28 | Aluminum | 10000 | 8000 | 500 | 10000 | 0.5 | 0.1 | Nb | 0.12 |
| Example 29 | Aluminum | 10000 | 8000 | 500 | 10000 | 2.0 | 0.4 | Nb | 2.40 |
| Example 30 | Aluminum | 10000 | 8000 | 500 | 10000 | 1.2 | 0.24 | Nb | 1.44 |
| Example 31 | Aluminum | 10000 | 8000 | 500 | 10000 | 0.5 | 0.5 | Nb | 1.00 |
| Example 32 | Aluminum | 10000 | 8000 | 500 | 10000 | 0.5 | 1 | Nb | 1.50 |

TABLE 3-continued

| | | Chemical conversion treatment (Pre-treatment) | | | | Surface treatment (Post-treatment) | | Metal particles | |
|---|---|---|---|---|---|---|---|---|---|
| | Metal Substrate | Zr (ppm) | V (ppm) | Al (ppm) | PAA (ppm) | Resin | Oxazoline | Metal species | Mixing amount (%) |
| Example 33 | Aluminum | 300 | 100 | 100 | — | 0.5 | 0.1 | Nb | 0.60 |
| Example 34 | Aluminum | 300 | 100 | 100 | — | 0.5 | 0.1 | Nb | 0.12 |
| Example 35 | Aluminum | 800 | 550 | 100 | 5500 | 0.5 | 0.1 | Nb | 0.60 |
| Example 36 | Aluminum | 800 | 550 | 100 | 5500 | 0.5 | 0.1 | Nb | 0.12 |

TABLE 4

| | Resin + Oxazoline/ Metal particles | Amount of metal oxide (mg/m$^2$) | Adhesion (kgf/cm$^2$) | | Corrosion resistance | |
|---|---|---|---|---|---|---|
| | | | Initial adhesion | Secondary adhesion | Hydrofluoric acid resistance | Alkali resistance |
| Example 21 | 1.00 | 136 | 2.5 | 2.5 | A | A |
| Example 22 | 5.00 | 27 | 2.5 | 2.5 | A | A |
| Example 23 | 1.00 | 544 | 2.5 | 2.5 | A | A |
| Example 24 | 1.00 | 326 | 2.5 | 2.5 | A | A |
| Example 25 | 1.00 | 227 | 2.0 | 2.0 | A | A |
| Example 26 | 1.00 | 340 | 2.0 | 2.0 | A | A |
| Example 27 | 1.00 | 136 | 2.5 | 2.5 | A | A |
| Example 28 | 5.00 | 27 | 2.5 | 2.5 | A | A |
| Example 29 | 1.00 | 544 | 2.5 | 2.5 | A | A |
| Example 30 | 1.00 | 326 | 2.5 | 2.5 | A | A |
| Example 31 | 1.00 | 227 | 2.0 | 2.0 | A | A |
| Example 32 | 1.00 | 340 | 2.0 | 2.0 | A | A |
| Example 33 | 1.00 | 136 | 2.5 | 2.5 | A | A |
| Example 34 | 5.00 | 27 | 2.5 | 2.5 | A | A |
| Example 35 | 1.00 | 136 | 2.5 | 2.5 | A | A |
| Example 36 | 5.00 | 27 | 2.5 | 2.5 | A | A |

TABLE 5

| | | Surface treatment | | Metal particles | |
|---|---|---|---|---|---|
| | Metal Substrate | Resin | Oxazoline | Metal species | Mixing amount (%) |
| Example 37 | Copper | 0.5 | 0.1 | Nb | 0.60 |
| Example 38 | Copper | 0.5 | 0.1 | Nb | 0.12 |
| Example 39 | Copper | 2.0 | 0.4 | Nb | 2.40 |
| Example 40 | Copper | 1.2 | 0.24 | Nb | 1.44 |
| Example 41 | Copper | 0.15 | 0.03 | Nb | 0.18 |
| Example 42 | Copper | 0.5 | 0.1 | Ca | 0.60 |
| Example 43 | Copper | 0.5 | 0.1 | Nd | 0.60 |
| Comparative Example 6 | Copper | 0.5 | 0.1 | — | — |
| Comparative Example 7 | Copper | 0 | 0.1 | Nb | 0.10 |
| Comparative Example 8 | Copper | 0.5 | 0 | Nb | 0.50 |

TABLE 6

| | Resin + Oxazoline/ Metal particles | Amount of metal oxide (mg/m$^2$) | Adhesion (kgf/cm$^2$) | | Corrosion resistance | |
|---|---|---|---|---|---|---|
| | | | Initial adhesion | Secondary adhesion | Hydrofluoric acid resistance | Alkali resistance |
| Example 37 | 1.00 | 136 | 2.0 | 1.5 | A | A |
| Example 38 | 5.00 | 27 | 2.0 | 1.5 | A | A |
| Example 39 | 1.00 | 544 | 2.0 | 1.5 | A | B |
| Example 40 | 1.00 | 326 | 2.0 | 1.5 | A | A |
| Example 41 | 1.00 | 41 | 2.0 | 1.5 | A | B |
| Example 42 | 1.00 | 136 | 1.5 | 1.0 | A | A |
| Example 43 | 1.00 | 136 | 1.5 | 1.0 | A | A |
| Comparative Example 6 | — | — | 2.0 | 1.0 | D | D |

TABLE 6-continued

|  | Resin + Oxazoline/ Metal particles | Amount of metal oxide (mg/m$^2$) | Adhesion (kgf/cm$^2$) | | Corrosion resistance | |
|---|---|---|---|---|---|---|
|  |  |  | Initial adhesion | Secondary adhesion | Hydrofluoric acid resistance | Alkali resistance |
| Comparative Example 7 | 1.00 | 23 | 0.5 | 0.0 | D | D |
| Comparative Example 8 | 1.00 | 113 | 0.5 | 0.0 | D | D |

TABLE 7

|  |  | Chemical conversion treatment (Pre-treatment) | | | | | | Surface treatment (Post-treatment) | |
|---|---|---|---|---|---|---|---|---|---|
|  | Metal Substrate | Zr (ppm) | V (ppm) | Al (ppm) | PAA (ppm) | Resin | Oxazoline | Metal species | Mixing amount (%) |
| Example 44 | Copper | 1000 | 300 | 150 | — | 0.5 | 0.1 | Nb | 0.60 |
| Example 45 | Copper | 1000 | 300 | 150 | — | 0.5 | 0.1 | Nb | 0.12 |
| Example 46 | Copper | 10000 | 8000 | 500 | 10000 | 0.5 | 0.1 | Nb | 0.60 |
| Example 47 | Copper | 10000 | 8000 | 500 | 10000 | 0.5 | 0.1 | Nb | 0.12 |
| Example 48 | Copper | 300 | 100 | 100 | — | 0.5 | 0.1 | Nb | 0.60 |
| Example 49 | Copper | 800 | 550 | 100 | 5500 | 0.5 | 0.1 | Nb | 0.60 |

TABLE 8

|  | Resin + Oxazoline/ Metal particles | Amount of metal oxide (mg/m$^2$) | Adhesion (kgf/cm$^2$) | | Corrosion resistance | |
|---|---|---|---|---|---|---|
|  |  |  | Initial adhesion | Secondary adhesion | Hydrofluoric acid resistance | Alkali resistance |
| Example 44 | 1.00 | 136 | 2.0 | 2.0 | A | A |
| Example 45 | 5.00 | 27 | 2.0 | 2.0 | A | A |
| Example 46 | 1.00 | 136 | 2.0 | 2.0 | A | A |
| Example 47 | 5.00 | 27 | 2.0 | 2.0 | A | A |
| Example 48 | 1.00 | 136 | 2.0 | 2.0 | A | A |
| Example 49 | 1.00 | 136 | 2.0 | 2.0 | A | A |

As is apparent from the results shown in Tables 1 to 8, all Examples 1 to 49 exhibited high adhesion between a resin film and a surface of a metal substrate, and also exhibited satisfactory corrosion resistance (hydrofluoric acid resistance and alkali resistance) of the metal material as compared with Comparative Examples 1 to 8. The results of Examples 1 to 49 revealed that regardless of whether a surface of a metal substrate is subjected to a chemical conversion treatment or not, it is possible to impart excellent corrosion resistances (hydrofluoric acid resistance and alkali resistance) while enhancing adhesion with the surface of the metal substrate by performing a surface treatment using the surface treatment agent of the present invention.

The results of Examples 1 to 5, 14, 15, 37, 38, 42 and 43, and Comparative Examples 1 and 6 shown in Tables 1, 2, 6 and 7 revealed that the effects of the present invention are not exerted if specific metal particles are not used. Namely, the results revealed that the effects of the present invention such as excellent corrosion resistance (hydrofluoric acid resistance and alkali resistance) are not exerted if the surface treatment agent does not contain metal particles containing at least one metal selected from the group consisting of Nb, Ca and Nd.

The results of Examples 1 to 5, 37 and 38, and Comparative Examples 2 and 7 shown in Tables 1, 2, 6 and 7 revealed that the effects of the present invention are not exerted if the surface treatment agent does not contain an acrylic resin having a carboxyl group and a hydroxyl group. The results of Examples 1 to 5, 37 and 38, and Comparative Examples 3 and 8 revealed that the effects of the present invention such as excellent adhesion and corrosion resistance (hydrofluoric acid resistance and alkali resistance) are not exerted if the surface treatment agent does not contain an oxazoline group-containing compound.

The results of Examples 8 to 10, 16 and 17 shown in Tables 1 and 2 revealed that the effects of the present invention such as adhesion and corrosion resistance (hydrofluoric acid resistance and alkali resistance) are enhanced when the content of metal particles of the surface treatment agent is within a range from 0.05 to 2.5% by mass in terms of metal oxide.

The results of Examples 1 to 7 shown in Tables 1 and 2 revealed that the effects of the present invention such as corrosion resistance (hydrofluoric acid resistance and alkali resistance) is enhanced when a mass ratio ("resin+oxazoline/metal particles" of Tables 2, 4, 6 and 8) of the total amount of the content of an acrylic resin having a carboxyl group and a hydroxyl group and the content of the oxazoline group-containing compound of the surface treatment agent to the content of metal particles is within a range from 0.4 to 7.5.

The results of Examples 1 to 7 shown in Tables 1 and 2 revealed that the effects of the present invention such as corrosion resistance (hydrofluoric acid resistance and alkali resistance) are enhanced when the content ("amount of metal oxide" in Tables 2, 4, 6 and 8) of metal derived from metal particles in the surface-treated film of the metal material is within a range from 20 to 600 mg/m$^2$ in terms of metal oxide.

INDUSTRIAL APPLICABILITY

According to the surface treatment agent of the present invention, it is possible to obtain a metal material capable of having excellent corrosion resistance (hydrofluoric acid resistance and alkali resistance) while enhancing adhesion between an organic resin layer, such as a resin film, and a surface of a metal substrate, the surface treatment agent of the present invention can be preferably applied to the production of a packaging material and electrode for a lithium ion battery.

The invention claimed is:

1. A surface treatment agent for treating a surface of a metal substrate to form a surface-treated film, the surface treatment agent comprising:

an acrylic resin having a carboxyl group and a hydroxyl group, an oxazoline group-containing compound and metal particles, wherein the metal particles are particles containing at least one metal selected from the group consisting of Nb, Ca and Nd, wherein an amount of the metal particles is from 0.05 to 2.5% by mass in terms of metal oxide relative to total amount of the surface treatment agent, wherein a mass ratio of the total amount of the content of the acrylic resin having a carboxyl group and a hydroxyl group and the content of the oxazoline group-containing compound to the content of the metal particles in terms of metal oxide [(the total amount of the content of the acrylic resin having a carboxyl group and a hydroxyl group and the content of the oxazoline group-containing compound)/(the content of the metal particles in terms of metal oxide)] is from 0.4 to 7.5, and wherein the surface-treated film contains metal derived from the metal particles in the amount of 20 to 600 mg/m$^2$ in terms of metal oxide.

2. The surface treatment agent according to claim 1, wherein the metal particles are in the form of a niobium oxide sol.

3. A surface treatment method, which comprises applying the surface treatment agent according to claim 1 onto a surface of a metal substrate to form the surface-treated film.

* * * * *